US007418584B1

(12) United States Patent
Klaiber et al.

(10) Patent No.: US 7,418,584 B1
(45) Date of Patent: Aug. 26, 2008

(54) EXECUTING SYSTEM MANAGEMENT MODE CODE AS VIRTUAL MACHINE GUEST

(75) Inventors: Alexander C. Klaiber, Mountain View, CA (US); Geoffrey S. Strongin, Austin, TX (US); Kevin J. McGrath, Los Gatos, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 352 days.

(21) Appl. No.: 11/066,752

(22) Filed: Feb. 25, 2005

Related U.S. Application Data (60) Provisional application No. 60/569,995, filed on May 11, 2004.

(51) Int. Cl.
*G06F 7/38* (2006.01)
*G06F 9/00* (2006.01)
*G06F 9/44* (2006.01)
*G06F 15/00* (2006.01)

(52) U.S. Cl. .................. 712/229; 712/244
(58) Field of Classification Search .......... 712/229
See application file for complete search history.

(56) References Cited

U.S. PATENT DOCUMENTS

| 4,812,967 | A  | * | 3/1989  | Hirosawa et al. ........... 710/269 |
| 5,361,375 | A  | * | 11/1994 | Ogi .......................... 718/1 |
| 5,987,604 | A  | * | 11/1999 | Edrich ........................ 713/1 |
| 6,397,242 | B1 | * | 5/2002  | Devine et al. ............... 718/1 |
| 6,418,498 | B1 | * | 7/2002  | Martwick .................. 710/269 |
| 6,785,886 | B1 | * | 8/2004  | Lim et al. .................... 718/1 |
| 2003/0217250 | A1 | * | 11/2003 | Bennett et al. ............. 712/224 |
| 2004/0117532 | A1 | * | 6/2004  | Bennett et al. ............. 710/260 |
| 2005/0076186 | A1 | * | 4/2005  | Traut ............................ 712/1 |

OTHER PUBLICATIONS

Intel; Intel Architecture Software Developer's Manual, vol. 3: System Programming; 1999; pp. 3-23,3-29,12-1.*
P.H. Gum, "System/370 Extended Architecture: Facilities for Virtual Machines," IBM J. Res Develop., vol. 27, No. 6, Nov. 1983, (pp. 530-544).
"Operating System Writer's Guide," Pentium Pro Family Developer's Manual, vol. 3, 1996, (12 Pages).
James L. Turley, "Advanced 80386 Programming Techniques," ISBN 0-07-881342-5, (35 Pages).

* cited by examiner

*Primary Examiner*—Eddie P Chan
*Assistant Examiner*—Corey S Faherty
(74) *Attorney, Agent, or Firm*—Lawrence J. Merkel; Meyertons, Hood, Kivlin, Kowert & Goetzel, P.C.

(57) ABSTRACT

In one embodiment, a register in a processor is programmable with an intercept indication indicative of whether or not an event that would cause a transition by the processor to a first mode is to be intercepted during execution of a guest. Responsive to the intercept indication and further responsive to detecting the event, execution circuitry in the processor is configured to exit the guest. In another embodiment, a method comprises: detecting an event that would cause a processor to transition to a first mode, wherein first code is to be executed in the first mode; and causing the first code to be executed in a guest responsive to the detecting. In still another embodiment, a computer accessible medium comprising instructions which when executed in response to detecting the event, cause the first code to be executed in a guest.

21 Claims, 8 Drawing Sheets

EXECUTING SYSTEM MANAGEMENT MODE CODE AS VIRTUAL MACHINE GUEST

This application claims benefit of priority to U.S. Provisional Patent Application Ser. No. 60/569,995, filed on May 11, 2004.

BACKGROUND

1. Field of the Invention

This invention relates to virtualization and the use of virtual machines in processors and computer systems and, more particularly, to virtualization of system management mode (SMM) code execution.

2. Description of the Related Art

Virtualization has been used in computer systems for a variety of different purposes. For example, virtualization may be used to execute privileged software in a "container" to prevent the privileged software from directly accessing and/or making changes to at least some of the physical machine state without first being permitted to do so by a virtual machine manager (VMM) that controls the virtual machine. Such a container may prevent "buggy" or malicious software from causing problems on the physical machine. Additionally, virtualization may be used to permit two or more privileged programs to execute on the same physical machine concurrently. The privileged programs may be prevented from interfering with each other since access to the physical machine is controlled. Privileged programs may include operating systems, and may also include other software which expects to have full control of the hardware on which the software is executing. In another example, virtualization may be used to execute a privileged program on hardware that differs from the hardware expected by the privileged program.

Generally, virtualization of a processor or computer system may include providing one or more privileged programs with access to a virtual machine (the container mentioned above) over which the privileged program has full control, but the control of the physical machine is retained by the VMM. The virtual machine may include a processor (or processors), memory, and various peripheral devices that the privileged program expects to find in the machine on which it is executing. Each privileged program (and related software in some cases, such as the applications that execute on an operating system) may be referred to herein as a guest. Virtualization may be implemented in software (e.g. the VMM mentioned above) without any specific hardware virtualization support in the physical machine on which the VMM and its virtual machines execute. However, virtualization may be simplified and/or achieve higher performance if some hardware support is provided.

The x86 instruction set architecture specifies a "system management mode" (SMM). SMM provides a transparent mechanism for power management, original equipment manufacturer (OEM) differentiation, response to external asynchronous events such as the closing of a laptop lid, temperature sensor triggering, etc., and some forms of peripheral device virtualization. SMM enables an address space (referred to as system management random access memory (SMRAM)) that is not visible, or useable, in other modes. The SMRAM stores the code that is executed in SMM, referred to as SMM code. Thus, the SMM code is not available for execution in other modes. In some cases, the SMM code may be provided by the guest. In other cases, the SMM code is associated with the specific computer system ("platform SMM code"). Platform SMM code is loaded by low level initialization software (e.g. basic input/output system (BIOS) software) before the operating system is loaded and before the VMM is loaded.

A processor implementing the x86 instruction set architecture enters SMM in response to a system management interrupt (SMI) signalled to the processor from an external source. In PC systems, for example, the source is typically the SouthBridge component. Some processors may also be configured to detect an SMI internally (e.g. by detecting execution of certain instructions, such as IN or OUT instructions to a particular input/output (I/O) port).

If virtualization is being implemented, SMM may be entered at any time (e.g. while a guest is executing, or while the host VMM or other host software is executing). Additionally, virtualization may be used as part of a secure operating system base. When security is being maintained, the system classifies code as either "trusted" or "not trusted". Trusted code is typically precertified as trusted (not malicious, performing only the operation it is intended to perform), and may remain trusted as long as it remains unmodified (to protect against malicious programs such as viruses). Untrusted software may be executed in a virtual machine to protect machine state against undesirable modification by the software. In many cases, the SMM code is not trusted. A mechanism for handling SMM code when virtualization is being implemented is therefore desired.

SUMMARY

In one embodiment, a processor comprises a register and execution circuitry coupled to the register. The register is programmable with an intercept indication indicative of whether or not an event that would cause a transition by the processor to a first mode is to be intercepted during execution of a guest. The execution circuitry is configured to execute instructions. Responsive to the intercept indication indicating that the event is to be intercepted and further responsive to detecting the event, the execution circuitry is configured to exit the guest.

In another embodiment, a method comprises: detecting an event that would cause a processor to transition to a first mode, wherein first code is to be executed in the first mode; and causing the first code to be executed in a guest responsive to the detecting. In still another embodiment, a computer accessible medium comprising instructions which when executed in response to detecting the event, cause the first code to be executed in a guest.

BRIEF DESCRIPTION OF THE DRAWINGS

The following detailed description makes reference to the accompanying drawings, which are now briefly described.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS

Virtualization Overview

Figure 1:
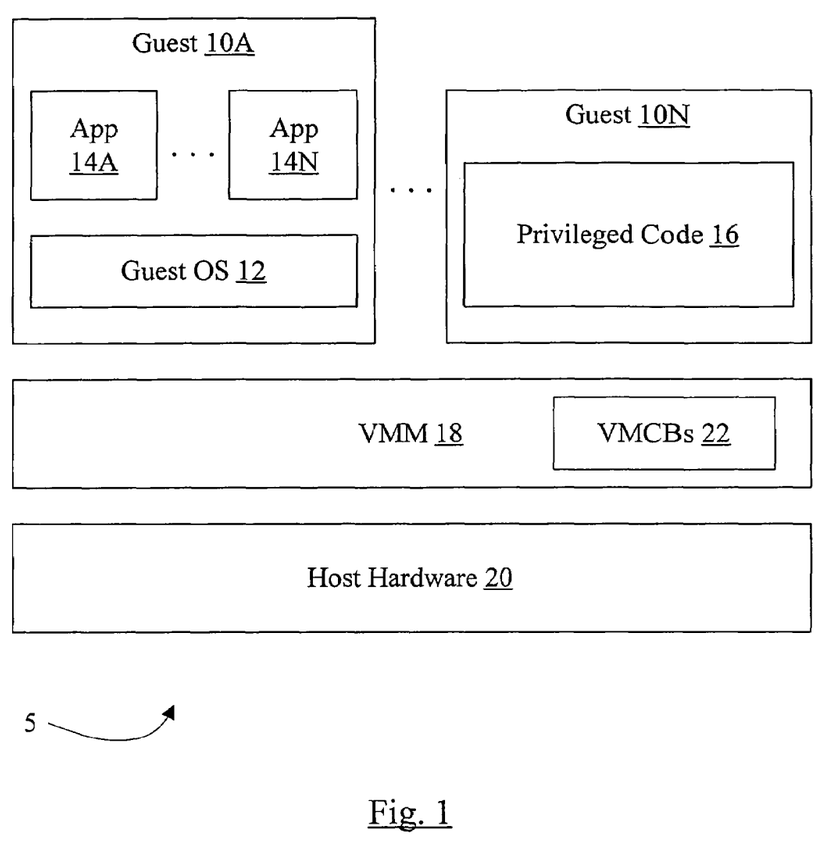
FIG. 1 is a block diagram of one embodiment of a computer system that implements virtualization.

Turning now to FIG. 1, a block diagram of one embodiment of a computer system 5 that implements virtualization is shown. In the embodiment of FIG. 1, multiple guests 10A-10N are shown. Guest 10A includes a guest operating system (OS) 12 and one or more applications 14A-14N that run on the guest OS 12. Guest 10N includes privileged code 16. The guests 10A-10N are managed by a virtual machine manager (VMM) 18. The VMM 18 and the guests 10A-10N execute on host hardware 20, which may comprise the physical hardware included in the computer system 5. In one embodiment, the VMM 18 may maintain a set of virtual machine control blocks (VMCBs) 22. There may be one VMCB 22 for each guest 10A-10N. While the VMCBs 22 are shown as part of the VMM 18 for illustration in FIG. 1, the VMCBs 22 may be stored in memory and/or on non-volatile media such as disk drives in the host hardware 20.

The host hardware 20 generally includes all of the hardware included in the computer system 5. In various embodiments, the host hardware 20 may include one or more processors, memory, peripheral devices, and other circuitry used to couple the preceding components. For example, common personal computer (PC)-style systems may include a Northbridge coupling the processors, the memory, and a graphics device that uses the advanced graphic port (AGP) interface. Additionally, the Northbridge may couple to a peripheral bus such as the peripheral component interface (PCI) bus, to which various peripheral components may be directly or indirectly coupled. A Southbridge may also be included, coupled to the PCI bus, to provide legacy functionality and/or couple to legacy hardware. In other embodiments, other circuitry may be used to link various hardware components. For example, HyperTransport™ (HT) links may be used to link nodes, each of which may include one or more processors, a host bridge, and a memory controller. The host bridge may be used to couple, via HT links, to peripheral devices in a daisy chain fashion. Any desired circuitry/host hardware structure may be used.

In some embodiments, one or more components of the host hardware may include hardware support for virtualization. For example, the processor(s) may include hardware support for virtualization, as will be described in more detail below.

The VMM 18 may be configured to provide the virtualization for each of the guests 10A-10N, and may control the access of the guests 10A-10N to the host hardware 20. The VMM 18 may also be responsible for scheduling the guests 10A-10N for execution on the host hardware 20. The VMM 18 may be configured to use the hardware support provided in the host hardware 20 for virtualization.

In some embodiments, the VMM 18 may be implemented as a "thin" standalone software program that executes on the host hardware 20 and provides the virtualization for the guests 10A-10N. Such a VMM implementation may sometimes be referred to as a "hypervisor". In other embodiments, the VMM 18 may be integrated into or execute on a host OS. In such embodiments, the VMM 18 may rely on the host OS, including any drivers in the host OS, platform system management mode (SMM) code provided by the system BIOS, etc. Thus, the host OS components (and various lower-level components such as the platform SMM code) execute directly on the host hardware 20 and are not virtualized by the VMM 18.

In various embodiments, the VMM 18 may support full virtualization, para-virtualization, or both. Furthermore, in some embodiments, the VMM 18 may concurrently execute guests that are paravirtualized and guests that are fully virtualized.

With full virtualization, the guest 10A-10N is not aware that virtualization is occurring. Each guest 10A-10N may have contiguous, zero based memory in its virtual machine, and the VMM 18 may use shadow page tables to remap from guest virtual addresses to host physical addresses (effectively the remapping the guest "physical address" assigned by memory management software in the guest 10A-10N to host physical address). Using the shadow page tables for each guest 10A-10N, the VMM 18 may ensure that guests do not access other guest's physical memory in the host hardware 20. In one embodiment, in full virtualization, guests 10A-10N do not directly interact with the peripheral devices in the host hardware 20.

With para-virtualization, guests 10A-10N may be at least partially VM-aware. Such guests 10A-10N may negotiate for memory pages with the VMM 18, and thus remapping guest physical addresses to host physical addresses may not be required. In one embodiment, in paravirtualization, guests 10A-10N may be permitted to directly interact with peripheral devices in the host hardware 20. At any given time, a peripheral device may be "owned" by a guest or guests 10A-10N. In one implementation, for example, a peripheral device may be mapped into a protection domain with one or more guests 10A-10N that currently own that peripheral device. Only guests that own a peripheral device may directly interact with it. There may also be a protection mechanism to prevent devices in a protection domain from reading/writing pages allocated to a guest in another protection domain (e.g. using device exclusion vectors for each protection domain that define which physical pages are accessible to the device and which are not).

As mentioned previously, the VMM 18 may maintain a VMCB 22 for each guest 10A-10N. The VMCB 22 may generally comprise a storage area that is allocated by the VMM 18 for the corresponding guest 10A-10N. In one embodiment, the VMCB 22 may comprise a page of memory, although other embodiments may use larger or smaller memory areas and/or may use storage on other media such as non-volatile storage. In one embodiment, the VMCB 22 may include the guest's processor state, which may be loaded into a processor in the host hardware 20 when the guest is scheduled to execute and may be stored back to the VMCB 22 when the guest exits (either due to completing its scheduled time, or due to one or more intercepts that the processor detects for executing the guest). In some embodiments, only a portion of the processor state is loaded via the instruction that transfers control to the guest corresponding to the VMCB 22 (the "start virtual machine (SVM)" instruction), and other desired state may be loaded by the VMM 18 prior to executing the SVM instruction. Similarly, in such embodiments, only a portion of the processor state may be stored to the VMCB 22 by the processor on guest exit and the VMM 18 may be responsible for storing any additional state as needed. In other embodiments, the VMCB 22 may include a pointer to another memory area where the processor state is stored.

In one embodiment, the VMM 18 may also have an area of memory allocated to store the processor state corresponding to the VMM 18. When the SVM is executed, the processor state corresponding to the VMM 18 may be saved in the area. When the guest exits, the processor state from the area may be reloaded from the area to permit the VMM 18 to continue execution. In one implementation, for example, the processor may implement a register (e.g. a model specific register, or MSR) to store the address of the VMM 18 save area.

In one embodiment, the VMCB 22 may also include a set of intercept indications, one indication for each intercept event that the processor supports. The intercept indication may indicate whether or not the processor is to intercept the corresponding event. As used herein, an event is "intercepted" in a guest if, should the event occur in the guest, the processor exits the guest for processing of the event (or other processing) in the VMM 18. Thus, in this embodiment, the VMM 18 may configure the processor to intercept only those events that the VMM 18 does not wish the guest 10A-10N to handle internally. Events may include instructions (that is, intercept an instruction instead of executing it), interrupts, exceptions, and/or any other desired events that may occur during guest execution. In other embodiments, the processor may enter a guest mode and intercept on all events supported by the processor.

In one embodiment, the VMCB 22 may further include other control bits that may cause the processor to perform certain actions upon loading the VMCB 22. For example, the control bits may include indications to flush the TLB in the processor. Other control bits may specify the execution environment for the guest (e.g. interrupt handling modes, an address space identifier for the guest, etc.). Still other control bits may be used to communicate an exit code describing why the guest exited, etc.

Generally, a "guest" may comprise any one or more software programs that are to be virtualized for execution in the computer system 5. A guest may include at least some code that executes in privileged mode, and thus expects to have full control over the computer system on which it is executing. As mentioned previously, guest 10A is an example in which the guest includes a guest OS 12. The guest OS 12 may be any OS, such as any of the Windows OSs available from Microsoft Corp., (Redmond, Wash.), any UNIX-type operating system such as Linux, AIX from IBM Corporation (Armonk, N.Y.), Solaris from Sun Microsystems, Inc. (Santa Clara, Calif.), HP-UX from Hewlett-Packard Company (Palo Alto, Calif.), etc. The guest 10N is an example of a guest that comprises non-OS privileged code 16.

It is noted that the letter "N" when used herein in reference numerals such as 10N is meant to generically indicate any number of elements bearing that reference numeral (e.g. any number of guests 10A-10N, including one guest). Additionally, different reference numerals that use the letter "N" (e.g. 10N and 14N) are not intended to indicate like numbers of the different elements are provided (e.g. the number of guests 10A-10N may differ from the number of applications 14A-14N) unless otherwise noted.

SMM Virtualization

In various embodiments, SMM may be virtualized in the computer system 5, such that the SMM code is executed in a guest. The VMM 18 may implement a variety of mechanisms for virtualizing SMM in the computer system 5. For example, in some embodiments, the SMM code may be provided by the guests 10A-10N. In such embodiments, the SMM code may be executed in the corresponding guest 10A-10N (that is, the SMI may be reflected back into the guest 10A-10N). If platform SMM code is used, some embodiments may employ VMM SMM code that is executed to set up a guest in which the platform SMM code is executed. The VMM SMM code may be invoked in response to an SMI taken in the VMM 18. The processor may support intercepting a transition to SMM in the guests 10A-10N, to ensure that the SMI is taken from the VMM 18 and not the guests 10A-10N. In another embodiment, the VMM 18 may emulate the transition to SMM in software, and may invoke a guest including the SMM code directly (e.g. using the SVM instruction described above).

As mentioned above, the processor may support intercepting a transition to SMM in the guests 10A-10N. That is, the processor may detect an event that would cause a transition to SMM to occur during execution of a guest 10A-10N, and may exit the guest instead of making the transition. For example, in the above described embodiment, the intercept indication may be set to a state that causes the transition to SMM to be intercepted when a guest is executing, and the processor may exit the guest responsive to the intercept indication and detecting that the transition is to occur. Generally, exiting the guest may include interrupting execution of the guest, saving at least a portion of the guest's processor state (e.g. in the guest's VMCB 22), and invoking the host (e.g. the VMM 18). Intercepting a transition to SMM may include intercepting an SMI signalled to the processor. Intercepting a transition to SMM may further including intercepting an internally-generated SMI (e.g. due to a trap on an IOIO instruction based on the I/O trapping register, described in more detail below).

The processor may also support intercepting an instruction that indicates that the SMM code is complete (the RSM instruction). Intercepting the RSM instruction may 10 permit the VMM 18 to control the return of execution from the SMM mode.

SMM code executes in real mode (protected mode disabled and paging disabled) according to the x86 instruction set architecture. However, the VMM 18 uses paging to prevent access by a guest to another guest's pages (or to the VMM's pages or other host software's pages). The processor may support a "paged real mode" in which paging is enabled but protected mode is disabled (an illegal mode in the x86 instruction set architecture). In this manner, the processor may execute in non-protected mode but still use paging to control the guest's access to memory. The VMM 18 may ensure that the SMM code executes in paged real mode, and thus may map the SMM's pages as desired in the physical address space. The shadow page tables used by the VMM 18 for the SMM guest may also be used, in some embodiments, to map the SMRAM page(s) into the SMM guest's address space. Additionally, the shadow page tables may be used to ensure that the SMRAM is mapped to pages that are not in use by the VMM 18 or other guests. Still further, in some implementations, the VMM 18 may use the shadow page tables to map pages from another guest 10A-10N to the guest executing the SMM code (e.g. if the SMI is related to the other guest). Such mappings may permit the SMM code to access the guests pages in a similar fashion to the access that the SMM code would have if the guest and the SMM code were not virtualized by the VMM 18.

While the present description refers to virtualizing system management mode as defined in the x86 instruction set architecture, other embodiments may use similar mechanisms to virtualize any system management-like mode. For example, any mode that enables an address space not visible, nor useable, in other modes may be virtualized in the fashion described. Particularly, in some embodiments, the code to be executed in the mode may be stored in the address space that is not useable in the other modes. As used herein, the term "code" may refer to one or more instruction sequences that are arranged to perform a desired function or set of functions (when executed), and are logically considered to be a unit. Thus, SMM code may be one or more instruction sequences arranged to implement the SMM functions. Each instruction sequence comprises one or more instructions to be executed, where the instructions are defined in the instruction set architecture implemented by the processor.

Processor Support

Figure 2:
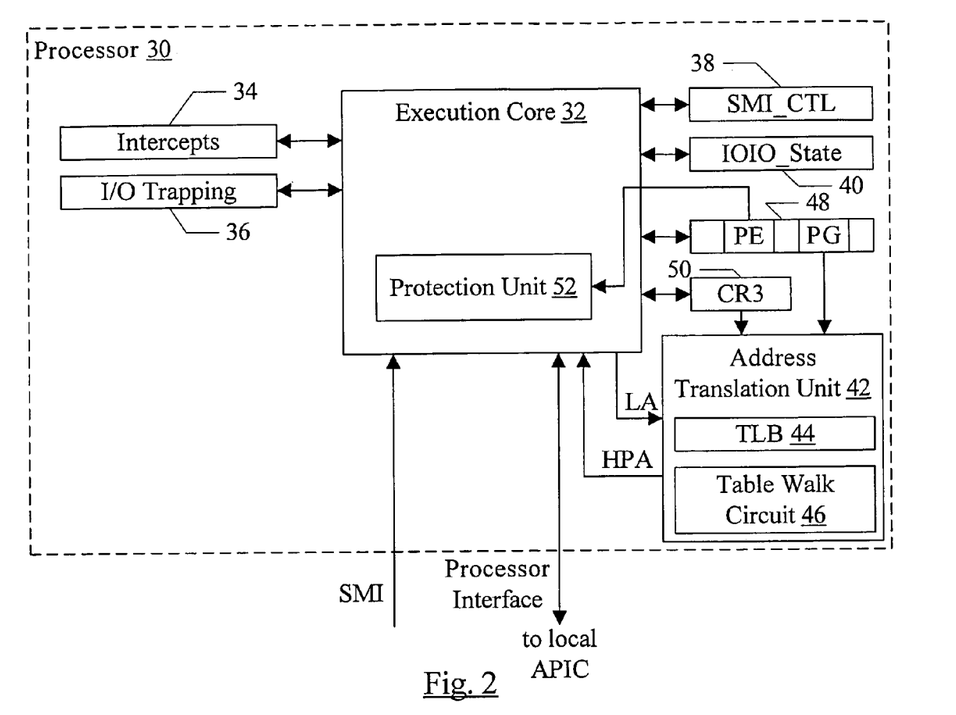
FIG. 2 is a block diagram of a portion of one embodiment of a processor.

FIG. 2 is a block diagram illustrating one embodiment of a processor 30 that may be included in the host hardware 20 and may provide support for SMM virtualization. In the illustrated embodiment, the processor 30 includes an execution core 32, an intercepts register 34, an I/O trapping register 36, an SMI control (SMI_CTL) register 38, an IOIO_State register 40 used for I/O space input/output (IOIO) instructions, an address translation unit 42 including a translation lookaside buffer (TLB) 44 and a table walk circuit 46, a first control register 48 (CR0), and a second control register 50 (CR3). The execution core 32 includes a protection unit 52. The execution core is coupled to the intercepts register 34, the I/O trapping register 36, the SMI_CTL register 38, the IOIO_state register 40, the CR0 register 48, and the CR3 register 50. More particularly, the protection control unit 52 may be coupled to receive the protection enable (PE) bit from the CR0 register 48. The address translation unit 42 is coupled to receive the paging enable (PG) bit from the CR0 register 48, and the page table base address from the CR3 register 50. The address translation unit 42 is coupled to receive one or more linear addresses (LA) from the execution core 32 and to return corresponding host physical addresses (HPA) to the execution core 32.

Generally, the execution core 32 is configured to execute the instructions defined in the instruction set architecture implemented by the processor 30 (e.g. the x86 instruction set architecture, including AMD64™ extensions as desired). The execution core 32 may employ any construction. For example, the execution core 32 may be a superpipelined core, a superscalar core, or a combination thereof. Alternatively, the execution core 32 may be a scalar core, a pipelined core, a non-pipelined core, etc. The execution core 32 may employ out of order speculative execution or in order execution, in various embodiments. The execution core 32 may include microcoding for one or more instructions or other functions, in combination with any of the above constructions.

The protection unit 52 may enforce the privilege level protections defined in the instruction set if protected mode is enabled via the PE bit. More particularly, privilege level protections may be enabled, in one embodiment, if the PE bit is set and disabled if the PE bit is clear. The protection unit 52 may comprise circuitry, may be implemented in microcode executed by the execution core 32, or a combination of circuitry and microcode. In some embodiments, the protection unit 52 may be implemented in a distributed fashion, with various protections implemented at various points in the execution core 52 that handle operations affected by those protections. If protected mode is not enabled (e.g. in paged real mode), no privilege level protections are enforced by the protection unit 52. Additionally, segmentation protection is disabled if protected mode is disabled.

The execution core 32 may generate linear addresses to fetch instructions for execution, as well as linear addresses of data accesses to memory. The execution core 32 may provide such linear addresses to the address translation unit 42 for translation, and the address translation unit 42 may return corresponding host physical addresses (HPAs) to the execution core 42. The address translation unit 42 may be enabled by the PG bit from the CR0 register 48. If paging is not enabled (PG bit is clear), the TLB 44 may be filled with identity mapping translations (that is, the LA may equal the HPA). If paging is enabled (PG bit is set), the TLB 44 may store translations from the page tables indicated by the CR3 register 50. In some embodiments that implement address space numbering, the TLB 44 may have a mix of translations from different sets of page tables corresponding to different values in the CR3 register 50, tagged by address space number.

In the illustrated embodiment, the address translation unit 42 may access the TLB 44 for each linear address, and may return the HPA indicated in the TLB 44 if a TLB hit is detected. If a miss is detected the table walk circuit 46 may search the page tables located by the base address in the CR3 register 50 for a translation. If no translation is found, the table walk circuit 46 may generate a page fault for the instruction corresponding to the linear address for which there is no translation. If a translation is found, the table walk circuit 46 may update the TLB to reflect the translation and the corresponding HPA may be provided to the execution core 32. In some embodiments, the table walk circuit 46 may be partially or fully implemented in microcode executed by the execution core 32. It is noted that, in some embodiments, the address translation unit 42 may be implemented in a distributed fashion within the execution core 32. Additionally, the TLB 44 may have any desired construction, including hierarchical levels and/or split instruction and data TLBs.

When the processor 30 is executing a guest, the VMM 18 may ensure that the CR3 register 50 is pointing to the shadow page tables maintained by the VMM 18 to map LAs to HPAs. The guest may also maintain guest page tables in modes in which the guest has enabled paging, which map the linear addresses to guest physical addresses. In guest modes in which paging is not enabled, there are no guest page tables. However, the VMM 18 may still enable paging so that the VMM 18 may control the pages accessed by the guest (e.g. paged real mode).

The execution core 72 may be configured to monitor for various intercepts indicated in the intercepts register 34. The intercepts register 34 may be loaded from the VMCB 22 of a guest 10A-10N when execution of that guest 10A-10N is initiated (e.g. using the SVM instruction described above). If the execution core 32 detects an interceptable event and the intercepts register 34 indicates that the detected event is being intercepted, the execution core 32 may exit the guest being executed and return to the VMM 18. If no intercepts are coded in the intercepts register 34, then a guest is not in execution. In other embodiments, there may be a "guest mode" bit and all interceptable events may be intercepted.

As mentioned previously, one or more of the intercepts may be defined to intercept a transition to SMM. In the present embodiment, SMM transitions may occur responsive to various events. For example, an external source (such as a SouthBridge) may signal an SMI by asserting an SMI signal received by the execution core 32. Generally, the SMI signal may be defined to be asserted in either a high or low state, in various embodiments. Alternatively, some embodiments may implement a local interrupt controller to which the processor 30 is coupled (e.g. according to the Advanced Programmable Interrupt Controller, or APIC, specification). A message may be transmitted to the local APIC to signal the SMI. The execution core 32 may be coupled to a processor interface to the local APIC, and an indication of the SMI message may be communicated by the local APIC to the execution core 32 over the processor interface. Alternatively, the local APIC may assert the SMI signal in response to the message. Thus, the assertion of the SMI signal or the receipt of the SMI message may be events that cause a transition to SMM.

In the present embodiment, in addition to the above methods for signalling an SMI, the processor 30 may be programmed to cause an SMI internally. The I/O trapping register 36 may be used for this purpose with respect to the IOIO instructions. The IOIO instructions are defined to access I/O using an I/O address space, and include the IN, OUT, INS, and OUTS instructions. When executed, an IOIO instruction results in the generation (using one or more operands) of an I/O port to which an I/O read (IN instruction) or write (OUT instruction) is directed. The I/O trapping register 36 may be programmed to indicate, directly or indirectly, which I/O ports cause an SMI when an access is attempted using and IOIO instruction. Thus, an internal SMI due to executing an IOIO instruction may also be an event that may cause the transition to SMM that may be intercepted.

If a transition to SMM is intercepted and the corresponding intercept is enabled in the intercepts register 34, the execution core 32 may exit the guest and invoke the VMM 18. That is, the execution core 32 may exit the guest instead of transitioning to SMM. Similarly, if the RSM instruction is detected and the corresponding intercept is enabled in the intercepts register 34, the execution core 32 may exit the guest and invoke the VMM 18 instead of executing the RSM instruction. Intercepting a transition to SMM will be more succinctly referred to herein as intercepting an SMI.

In some embodiments, the execution core 32 may support the SMI_CTL register 38 to permit the VMM 18 to directly control certain aspects of the transition to and from SMM. That is, by writing various predefined values to the SMI_CTL register 38, the VMM 18 may force the processor 30 to perform portions of the transition to SMM. The VMM 18 may write the SMI_CTL register 38 to emulate the transition to SMM or to cause the transition to SMM. For example, the transition to SMM may include transmitting an acknowledgement message to the system (e.g. over a system interface, not shown in FIG. 2, although the implementation may vary in other embodiments). The transition from SMM back to the mode from which SMM was entered may also include transmitting the acknowledgement message. The VMM 18 may control the transmission of such messages by writing a predefined value to the SMM_CTL register 38. Similarly, the VMM 18 may control when SMM is considered active by the processor 30 by writing a predefined value to the SMI_CTL register 38. The VMM 18 may control when SMM is considered active by writing a predefined value to the SMI_CTL register 38. The processor 30 may transmit the indication on the system interface as part of each communication (or may assert a pin continuously when SMI is active). Furthermore, visibility to the SMRAM address space may be controlled by whether or not SMM is active. Additionally, the VMM 18 may control the clearing of an SMI pending flag in the processor 30 in this manner as well. In one embodiment, the SMI_CTL register 38 may comprise a bit for each of the above and the predefined value may comprise setting the bit via a write to the SMI_CTL register 38. Other embodiments may use the opposite states for the bit or any other value. Other embodiments may not implement the SMI_CTL register 38.

In some embodiments, the execution core 32 may save state for an IOIO instruction for access by the VMM 18 in the IOIO_State register 40. For example, the operands of the IOIO instruction may be saved, along with the address of the IOIO instruction and various other control information related to the IOIO instruction, as desired. The information may be used by the VMM 18 to rapidly identify the intercepted IOIO instruction. Other embodiments may not implement the IOIO_State register 40 and the state may be located by the VMM 18 in the VMCB 22 of the guest in which the IOIO instruction was intercepted.

It is noted that, while the PE bit and PG bit are shown in the present embodiment for enabling protected and enabling paging, respectively, when set, other embodiments may use any encoding of one or more indications to enable the modes. For example, the opposite meanings of the set and clear states of the PE bit and/or PG bit may be used, or multiple bit indications may be used. Other encodings of control register state may be used in other embodiments. For the present embodiment, paged real mode may be the mode in which the PE bit is clear and the PG bit is set.

It is noted that, while the registers 34, 36, 38, and 40 are described as a register, each of the registers 34, 36, 38, and 40 may be implemented as one or more registers, as desired.

Figure 3:
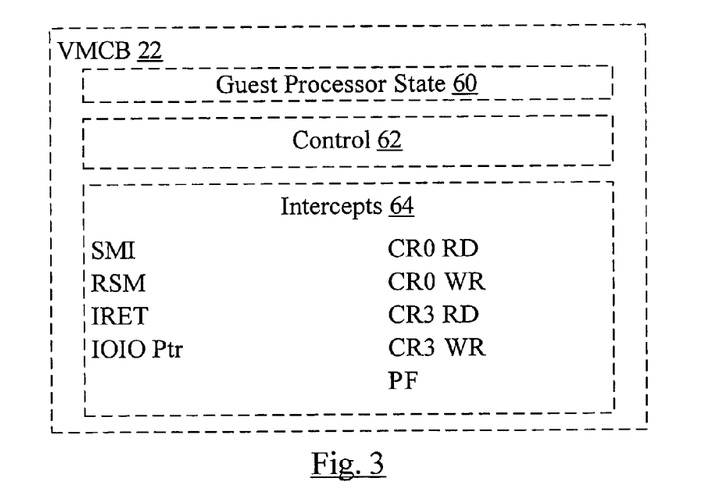
FIG. 3 is a block diagram of one embodiment of a virtual machine control block.

FIG. 3 is a block diagram of one embodiment of a VMCB 22. In the embodiment of FIG. 3, the VMCB 22 may include a guest processor state 60, control data 62, and intercepts 64. As mentioned previously, the guest processor state 60 may include various architected state that corresponds to the processor state at the point at which the guest last exited. The guest processor state 60 may also include implementation-specific state (e.g. model specific registers). For example, the guest processor state 60 may include implementation-specific state that is considered part of the processor's context. The guest processor state 60 may correspond to an initial state of the processor if the guest has not yet executed. The guest processor state 60 may be defined to store all the processor state, in some embodiments. In other embodiments, the guest processor state 60 may not be defined to store all processor state. Processor state not stored in the guest processor state 60 may be saved by the VMM 18 in other memory locations (or may be recreated by the VMM 18). Any subset of processor state may be included in the guest processor state 60. Among the processor state stored into the guest processor state 60 on guest exit and loaded from the guest processor state 60 via execution of the SVM instruction may be the contents of the control registers 48 and 50 (CR0 and CR3).

The control data 62 may include any desired control information to be used when execution of the corresponding guest is initiated or exiting. As mentioned previously, the control data 62 may include a guest exit code written by the processor 30 upon guest exit to indicate the reason for guest exit.

The intercepts 64 may specify which events are to be intercepted (causing an exit from the guest). Various intercepts may be defined in various embodiments. In the present embodiment, an SMI intercept, an RSM intercept, an interrupt return (IRET) intercept, a page fault (PF) intercept, a CR0 read (RD) intercept, a CR0 write (WR) intercept, a CR3 RD intercept, and a CR3 write intercept may be included in the intercepts 54. The intercepts 64 may also include a pointer (IOIO Ptr) to an I/O permissions bit map. The IOIO Ptr may point to an area of memory storing a bit map that is indexed by port number. If the I/O permissions bit map has a set bit for a given port, the processor 30 may exit the guest if an IOIO instruction generate that given port. Other embodiments may use the clear state of the bit to indicate intercept, or other indications.

The SMI intercept may indicate whether or not the transition to SMM mode is to be intercepted (e.g. due to the detection of an SMI signal assertion, SMI message, or IOIO trap). The RSM intercept may indicate whether or not execution of the RSM instruction is to be intercepted. These two intercepts may be used as discussed above. The IRET intercept may indicate whether or not execution of the IRET instruction is to be intercepted. When executing SMM code, the IRET instruction may be intercepted to detect that non-maskable interrupts are being reenabled, in one embodiment.

The PF, CR0 RD, CR0 WR, CR3 RD, and CR3 WR intercepts may be used to support paged real mode while the processor 30 is executing the SMM code (or other code that is written to be executed in real mode). The CR0 RD intercept may indicate whether or not reads of the CR0 register 48 are intercepted and the CR0 WR intercept may indicate whether or not writes to the CR0 register 48 are intercepted. Similarly, the CR3 RD and WR intercepts may indicate whether or not reads and writes of the CR3 register 50 are intercepted. In other embodiments, a single intercept may be provided for each register that indicates whether any access to the register is intercepted (read or write). The PF intercept may indicate whether or not page faults detected by the processor are intercepted.

The CR0 WR intercept permits the VMM 18 to ensure that paging is enabled if the guest attempts to enter real mode. The VMM 18 may override the value to be written to CR0 to ensure that the PG bit is set. The CR0 RD intercept permits the VMM 18 to mask the PG bit when the guest believes it is in real mode and reads the CR0 register 48. Similarly, the CR3 WR intercept permits the VMM 18 to override the page table base address set by the guest with the page table base address of the shadow page tables maintained by the VMM 18 for the guest; and the CR3 RD intercept permits the VMM 18 to insert the guest's CR3 value as a result of the CR3 RD. The PF intercept permits the VMM 18 to allocate a page for the missing "real" page in the paged real mode.

Each intercept indication (except the IOIO Ptr) may, e.g., be a bit which may enable the intercept when set or disable the intercept when clear. Other embodiments may assign the opposite meanings to the states of the bit or may use other indications.

Figure 4:
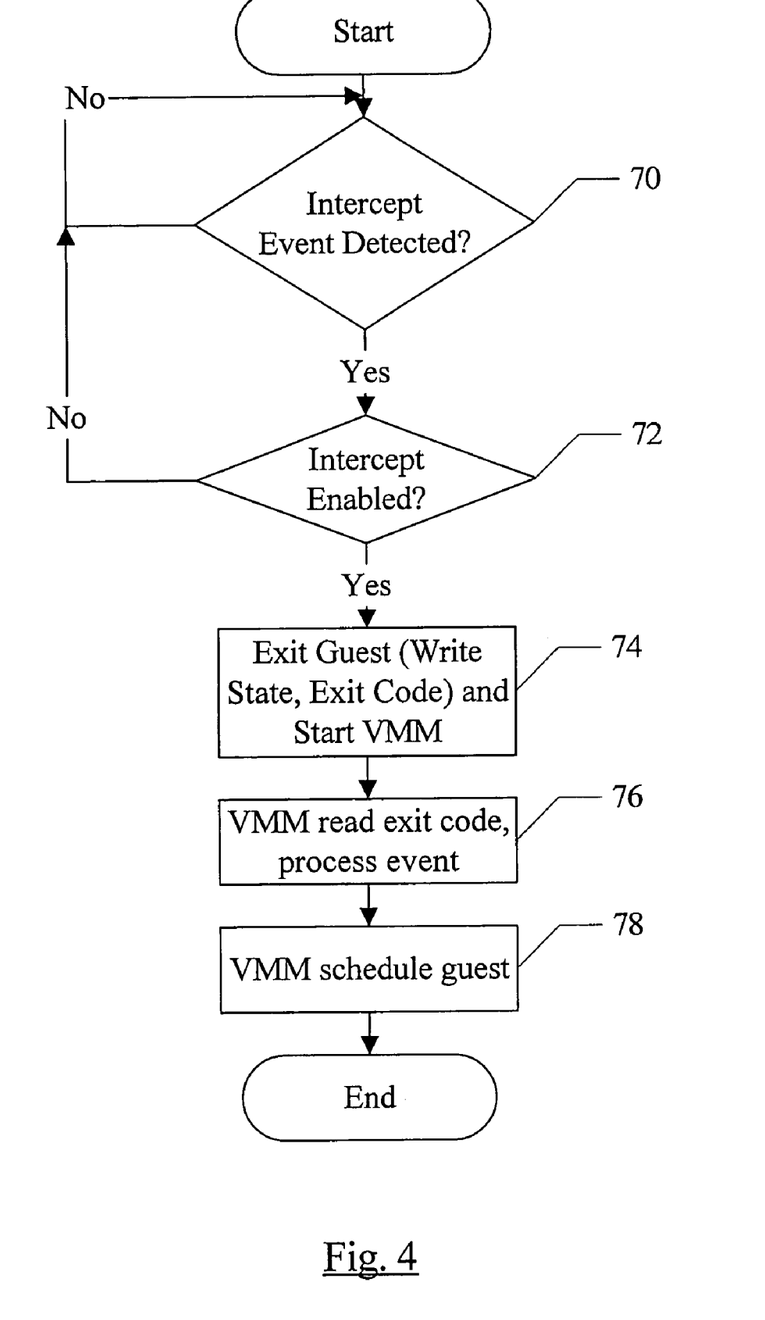
FIG. 4 is a flowchart illustrating one embodiment of intercepting an event in the guest.

FIG. 4 illustrates: for one embodiment, a high level view of operation of the processor 30 and the VMM 18 for intercepting an event during execution of a guest. If an intercept event is detected (decision block 70, "yes" leg) and the corresponding intercept is enabled (in the VMCB 22, and loaded into the processor 30 when execution of the guest is started—decision block 72, "yes" leg) the processor 30 exits the guest, storing processor state into the guest's VMCB 22 and the exit code indicating the reason for exit (e.g. identifying the intercept event that was detected). The VMM 18 may be started in response to the guest exit (block 74). For example, the address of the state save area for the VMM 18 may be maintained by in a register in the processor 30, as mentioned above, and the processor may load the VMM state from the state save area. The VMM 18 may read the exit code and process the identified intercept event (block 76). Processing the intercepted event may comprise calling code in the VMM 18 that is designed to process the particular event indicated by the exit code. Subsequently, the VMM 18 may schedule a guest (block 78). Scheduling the guest may include loading the state from the VMCB 22 into the processor 30 and starting the guest (e.g. using the SVM instruction and optionally instructions to load state prior to the SVM instruction).

SMM Virtualization Examples

FIGS. 5-8 illustrate various examples of virtualizing SMM. Various embodiments of the VMM 18 may implement one or more of the examples, in any combination, as desired.

Figure 5:
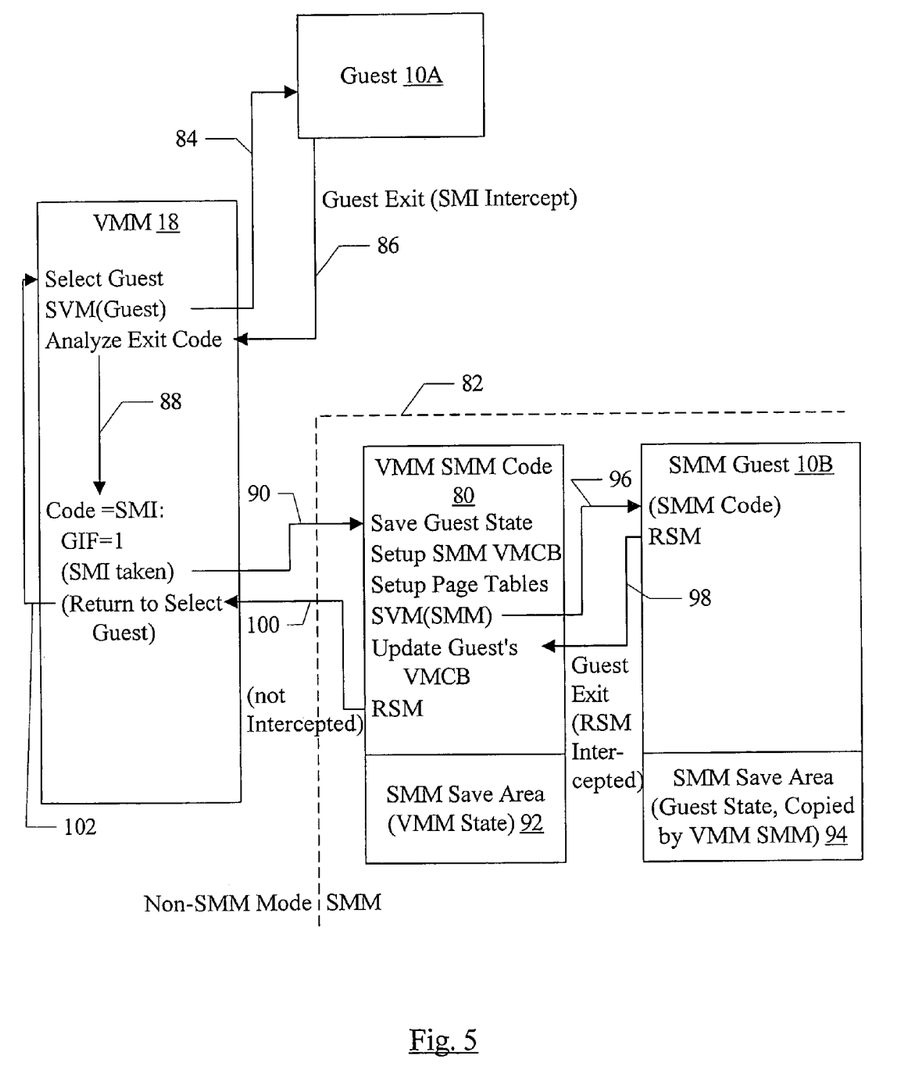
FIG. 5 is a block diagram illustrating a first embodiment of virtualizing SMM code.

FIG. 5 is an example of intercepting an SMI during execution of the guest 10A, taking the SMI (making the transition to SMM) in the VMM 18, using VMM SMM code 80 to prepare for execution of the SMM code, and executing the SMM code in an SMM guest 10B. Thus, in this example, the processor 30 does physically enter SMM. However, VMM may provide (and trust) VMM SMM code 80. The VMM SMM code 80 may be executed as a result of entering SMM. The VMM SMM code 80 may prepare for executing the SMM code in the SMM guest 10B, and may control access of the SMM guest 10B to the physical machine. The portion of FIG. 5 that executes in non-SMM mode (the guest 10A and the VMM 18) and the portion that executes in SMM (the VMM SMM code 80 and the guest 10B) are delimited by the dashed line 82 in FIG. 5. Various actions taken by the VMM 18, the VMM SMM code 80, and the SMM code in the SMM guest 10B for one embodiment are shown in FIG. 5. In one embodiment, each of the VMM 18, the VMM SMM code 80, and the SMM code may comprise one or more instructions which, when executed, implement the operations shown therein. In this example, the VMM 18 has previously set up the VMM SMM code 80 and has provided the base address of the SMRAM of the VMM SMM code 80 in the SMBASE register of the processor 30 (e.g. during initialization of the VMM 18).

Since SMM is entered in the example of FIG. 5, the processor 30 hardware that enters SMM is used. In particular, in one embodiment, the processor 30 may implement an MSR that stores the base address of the SMRAM address space (SMBASE). This register may be readable and writeable if virtualization is being used. For example, in one embodiment, the SVM instruction is enabled for execution via an enable bit in a control register. If the SVM instruction is enabled, the SMBASE register may be readable and writeable, so that it can be redirected to the SMRAM of the VMM SMM code 80. The SMBASE may previously have been initialized to the SMRAM of the SMM code in the SMM guest 10B, if the SMM code is platform SMM code.

Generally, the VMM 18 may select a guest to execute, and may execute the SVM instruction to cause the guest to begin execution on a processor (arrow 84). The VMM 18 may set the SMI intercept in the VMCB 22 of the guest 10A, to intercept any SMI that may occur during execution of the guest 10A. Other intercepts may be set as desired (e.g. the CR0, CR3, and PF intercepts may be set as part of managing the shadow page tables for the guest 10A).

If an SMI is intercepted (arrow 86), the processor 30 exits the guest 10A and invokes the VMM 18. The VMM 18 may continue executing subsequent to the SVM instruction. The VMM 18 may analyze the exit code in the VMCB 22 of the guest 10A, and determine that the exit code indicates an SMI. The VMM 18 may begin executing code that corresponds to the SMI intercept (arrow 88). In embodiments in which a partial state save and restore is performed by the processor on guest exit, the VMM 18 may save the remainder of the guest processor state to the VMCB 22 of the guest 10A (not shown in FIG. 5). The VMM 18 may also reload its own remaining processor state from its own state save area (also not shown in FIG. 5) to prepare for the real entry into SMM. The VMM 18 may enable global interrupts by setting the global interrupt flag (GIF). The processor 30 may have latched the SMI signalled while the guest 10A was executing. Setting GIF permits the latched SMI to be taken from the VMM 18 (arrow 90). Thus, the processor 30 enters SMM. No intercepts are enabled for the VMM SMM code 80, in one embodiment. That is, the VMM SMM code 80 does not execute as a guest.

In response to the SMI being taken, as part of entering SMM, the processor 30 automatically saves the context of the VMM in the SMM save area of the SMRAM corresponding to the VMM SMM code 80 (reference numeral 92). Additionally, the processor 30 generates the SMI acknowledgement message to the system, and indicates that SMM is active. Execution of the VMM SMM code 80 begins at the entry point in the SMRAM, as defined for SMM mode.

The VMM SMM code 80 may save the guest processor state of the guest 10A in the SMM save area of the SMRAM for the SMM code in the SMM guest 10B (reference numeral 94). For example, the guest processor state may be read from the VMCB 22 of the guest 10A. In some cases, the guest processor state stored into the SMM state save area 94 may be modified by the VMM SMM code 80 if certain state is not to be shared with the untrusted SMM code. For example, all of the guest's state may be hidden from (thus, not shared with) the SMM code for an externally-generated SMI and all of the guest's state except the state used to handle the SMI may be hidden from the SMM code for an internally-generated SMI, in some embodiments. If the SMI is internally generated due to an I/O trap on an IOIO instruction, the IOIO_State may be provided in the SMM state save area 94 (either from the registers 40 or from the VMCB of the guest 10A).

The VMM SMM code 80 may also setup the SMM's VMCB (for the guest 10B). Generally, the guest processor state 60 in the VMCB of the guest 10B may be the same as that stored in the SMM save area 94, with similar modifications by the VMM SMM code 80, if any. Thus, the copying of state to the SMM state save area 94 and to the guest processor state 60 in the VMCB of the guest 10B may be performed in parallel. Additionally, VMM SMM code 80 may update the guest processor state 60 to emulate transitioning to SMM (e.g. changing the instruction pointer in the VMCB to point to the entry point in the SMM code, changing the values of some control registers represented in the VMCB, etc.). However, rather than setting the CR0 value to real mode, the VMM SMM code 80 may set the CR0 value in the VMCB to paged real mode. The VMM SMM code 80 may set the IRET intercept and the RSM intercept in the VMCB of the guest 10B. Additionally, the CR0, CR3, and PF intercepts may be set to manage paged real mode.

Furthermore, if not already created, the VMM SMM code 80 may set up the shadow page tables for translating the "real" addresses in the guest 10B to the desired physical addresses. The page tables may additionally map the SMRAM used by the SMM code to any desired location in the physical memory of the host hardware 20. The CR3 value in the VMCB of the guest 10B may point to the shadow page tables.

The VMM SMM code 80 may then execute the SVM instruction, starting the guest 10B (arrow 96). The SMM code may then execute in the guest 10B, illustrated by "(SMM code)" in FIG. 5. If any intercepts occur while the SMM code is executing, the guest 10B exits but the processor 30 remains in SMM. Either the VMM SMM code 80 may process the event that caused the intercept, or the VMM SMM code 80 may call the code in the VMM 18 that processes the event.

The SMM code completes with the RSM instruction, which is intercepted by the processor in this example (arrow 98). The processor invokes the VMM 18 (which has its instruction pointer pointing to the instruction after the SVM in the VMM SMM code 80). The VMM SMM code 80 may optionally update the guest 10A's VMCB 22 with any processor state modifications made by the SMM code in the guest 10B. In some embodiments, the VMM 18 may take selected state modifications from the guest SMM save area 94 and copy them to the guest 10A's VMCB 22. Some values (e.g., CR0, CR3, etc.) may be modified for virtualization purposes. For example, the CR3 value programmed by the guest (as represented by the CR3 value in the guest SMM save area 94) may be replaced by a CR3 pointing to a corresponding shadow page table. The VMM SMM code 80 may or may not choose to make such updates, depending on various implementation factors. For example, if the SMI was internally generated or was generated externally as a result of an IOIO instruction, the SMM code may have emulated the operation of the targeted device. In such cases, if the IOIO instruction is not to be restarted, some state may be copied (e.g. the result of emulating the IOIO instruction, an adjustment to the instruction pointer to point to the next instruction after the IOIO instruction, etc.). On the other hand, if the IOIO instruction is to be restarted, then no emulation may have occurred and thus no state may need to be copied. The VMM SMM code 80 may then execute an RSM instruction. This instruction is not intercepted in this example (arrow 100), and thus the processor 30 exits SMM mode (generating the SMI acknowledgement message to the system, clearing SMM active, and restoring the state from the SMM save area 92) to the processor 30. Execution returns to the VMM 18, which may return to select a guest to execute (arrow 102). The guest selected need not be the guest 10A, if desired.

While the example of FIG. 5 illustrates intercepting an SMI in the guest 10A, similar operation may occur (beginning with the arrow 90) for an SMI that is taken while the VMM 18 (or other host code) is executing. The state saved by the VMM SMM code 80 into the SMM save area 94 (and the VMCB for the guest 10B) is the host state in such a circumstance, although the VMM SMM code 80 may modify the state as described above. Additionally, after the SMM code completes and the RSM in the SMM guest 10B is intercepted, the host's state in the SMM save area 92 may optionally be updated before executing the RSM to return control to the VMM 18.

Figure 6:
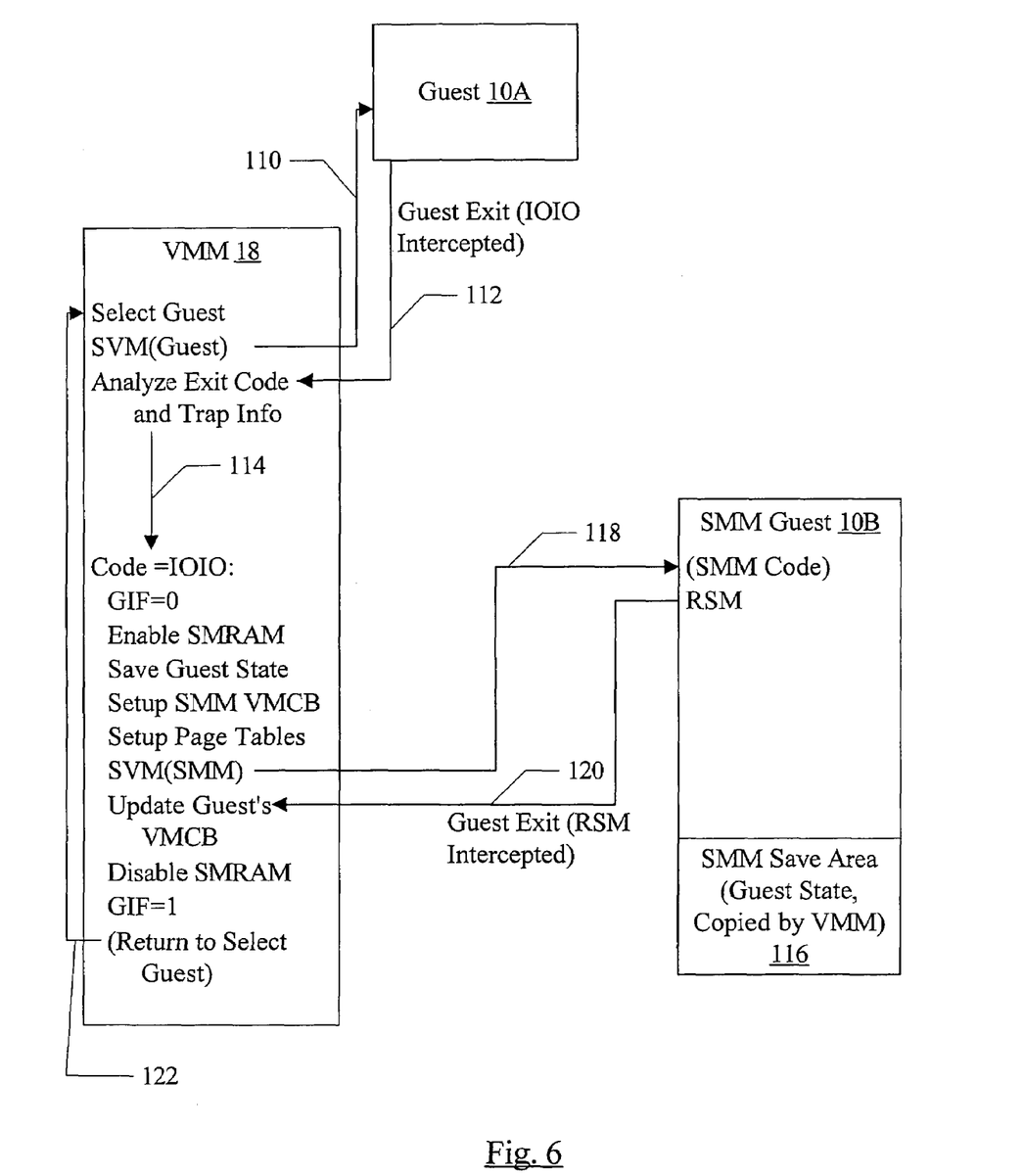
FIG. 6 is a block diagram illustrating a second embodiment of virtualizing SMM code.

The example of FIG. 6 illustrates a mechanism for emulating SMM without physically transitioning to SMM. Shown in FIG. 6 are the guest 10A, the VMM 18, and the SMM guest 10B. Various actions taken by the VMM 18 and the SMM code in the SMM guest 10B are shown in FIG. 6 for one embodiment. In one embodiment, each of the VMM 18 and the SMM code may comprise one or more instructions which, when executed, implement the operations shown therein.

The example of FIG. 6 may be used for internally generated SMIs (e.g. on IOIO instructions). In some embodiments, the example of FIG. 5 may be used for externally generated SMIs and the example of FIG. 6 may be used for internally generated SMIs (virtualized as IOIO intercepts).

The example of FIG. 6 may virtualize the I/O trapping register 36 for guests such as guest 10A. In one embodiment, an I/O permissions bit map may be associated with the guest in the guest's VMCB, via the IOIO pointer to the I/O permissions bit map shown in FIG. 3. If a given port is intercepted via the I/O permissions bit map, the processor 30 may exit the guest and provide the IOIO exit code. The ports indicated as trapped via the I/O trapping register 36 may be intercepted using the I/O permissions bit map as well. Thus, an IOIO intercepted may be generated rather than an SMI intercept (or a physical SMI). In such embodiments, the I/O trapping register 36 may not be used. The VMM 18 may separately track which intercepts in the I/O permissions bit map are due to virtualizing the I/O trapping register 36 and which intercepts are for other purposes.

More particularly, in one implementation, the VMM 18 may examine the I/O trapping register 36 when the VMM 18 is first initialized, and may record each trapped port as requiring the platform SMM code to be executed. Each trapped port may be recorded in the I/O permissions bit map as being intercepted. Similarly, if a guest attempts to trap ports in the I/O trapping register 36, the VMM 18 may record intercepts for the ports and may also record each such port as requiring guest SMM code to be executed. The I/O trapping register 36 may then be cleared of any traps, and the IOIO intercepts may be used.

Similar to the example of FIG. 5, the VMM 18 may select a guest (e.g. the guest 10A) to execute, and may execute the SVM instruction to begin execution of guest 10A (arrow 110). The VMCB 22 of the guest 10A may include the IOIO pointer to the I/O permissions bit map described above. Other intercepts may be set as desired (e.g. the CR0, CR3, and PF intercepts may be set as part of managing the shadow page tables for the guest 10A).

A guest exit may be detected, and the processor 30 may exit the guest 10A, recording that an IOIO intercept has been detected in the exit code of the VMCB for the guest 10A (arrow 112). The processor 30 may invoke the VMM 18, which continues executing subsequent to the SVM instruction. The VMM 18 may analyze the exit code in the VMCB 22 of the guest 10A, and determine that the exit code indicates an IOIO intercept. Additionally, the VMM 18 may examine the previously recorded trap information to determine that the IOIO intercept is due to a trap that requires platform SMM code. The VMM 18 may begin executing code that corresponds to the IOIO intercept for platform code (arrow 114). In embodiments in which a partial state save and restore is performed by the processor on guest exit, the VMM 18 may save the remainder of the guest processor state to the VMCB 22 of the guest 10A (not shown in FIG. 6). The VMM 18 may also reload its own remaining processor state from its own state save area (also not shown in FIG. 6). The VMM 18 may disable global interrupts by clearing the global interrupt flag (GIF), thus blocking SMIs while the internally-generated SMI for the IOIO instruction is emulated.

The VMM 18 may enable SMRAM in the processor 30 (e.g. by writing the SMM_CTL register to set SMM active). Additionally, the VMM 18 may cause the processor 30 to transmit the SMM acknowledge message to the system using the write to the SMM_CTL register. The VMM 18 may save the guest processor state of the guest 10A in the SMM save area of the SMRAM for the SMM code in the SMM guest 10B (reference numeral 116). For example, the guest processor state may be read from the VMCB 22 of the guest 10A and written to the SMM save area 116. In some cases, the guest processor state stored into the SMM state save area 116 may be modified by the VMM 18 if certain state is not to be shared with the untrusted SMM code. The IOIO_State may be provided in the SMM state save area 94 (either from the registers 40 or from the VMCB of the guest 10A).

The VMM 18 may also setup the SMM's VMCB (for the guest 10B). Generally, the guest processor state 60 in the VMCB of the guest 10B may be the same as that stored in the SMM save area 116. Thus, the copying of state to the SMM state save area 116 and to the guest processor state 60 in the VMCB of the guest 10B may be performed in parallel. Additionally, the VMM 18 may update the guest processor state 60 to emulate transitioning to SMM (e.g. changing the instruction pointer in the VMCB to point to the entry point in the SMM code, changing the values of some control registers represented in the VMCB, etc.). However, rather than setting the CR0 value to real mode, the VMM 18 may set the CR0 value in the VMCB to paged real mode. The VMM 18 may set the IRET intercept and the RSM intercept in the VMCB of the guest 10B. Additionally, the CR0, CR3, and PF intercepts may be set to manage paged real mode.

Furthermore, if not already created, the VMM 18 may set up the shadow page tables for translating the "real" addresses in the guest 10B to the desired physical addresses. The page tables may additionally map the SMRAM used by the SMM code to any desired location in the physical memory of the host hardware 20. The CR3 value in the VMCB of the guest 10B points to the shadow page tables.

The VMM 18 may then execute the SVM instruction, starting the guest 10B (arrow 118). The SMM code may then execute in the guest 10B, illustrated by "(SMM code)" in FIG. 6. If any intercepts occur while the SMM code is executing, the guest 10B exits to the VMM 18, like other guests.

The SMM code completes with the RSM instruction, which is intercepted by the processor in this example (arrow 120). The processor may invoke the VMM 18. The VMM 18 may optionally update the guest 10A's VMCB 22 with any processor state modifications made by the SMM code in the guest 10B. The VMM 18 may or may not choose to make such updates, similar to the discussion above with regard to FIG. 5. Additionally, the VMM 18 may disable the SMRAM in the processor 30 and cause the processor 30 to transmit the SMM acknowledgement message via a write to the SMI_CTL register 38. The VMM 18 may set the GIF flag to reenable SMIs. Execution may return to select a guest to execute (arrow 122). The guest selected need not be the guest 10A, if desired.

Figure 7:
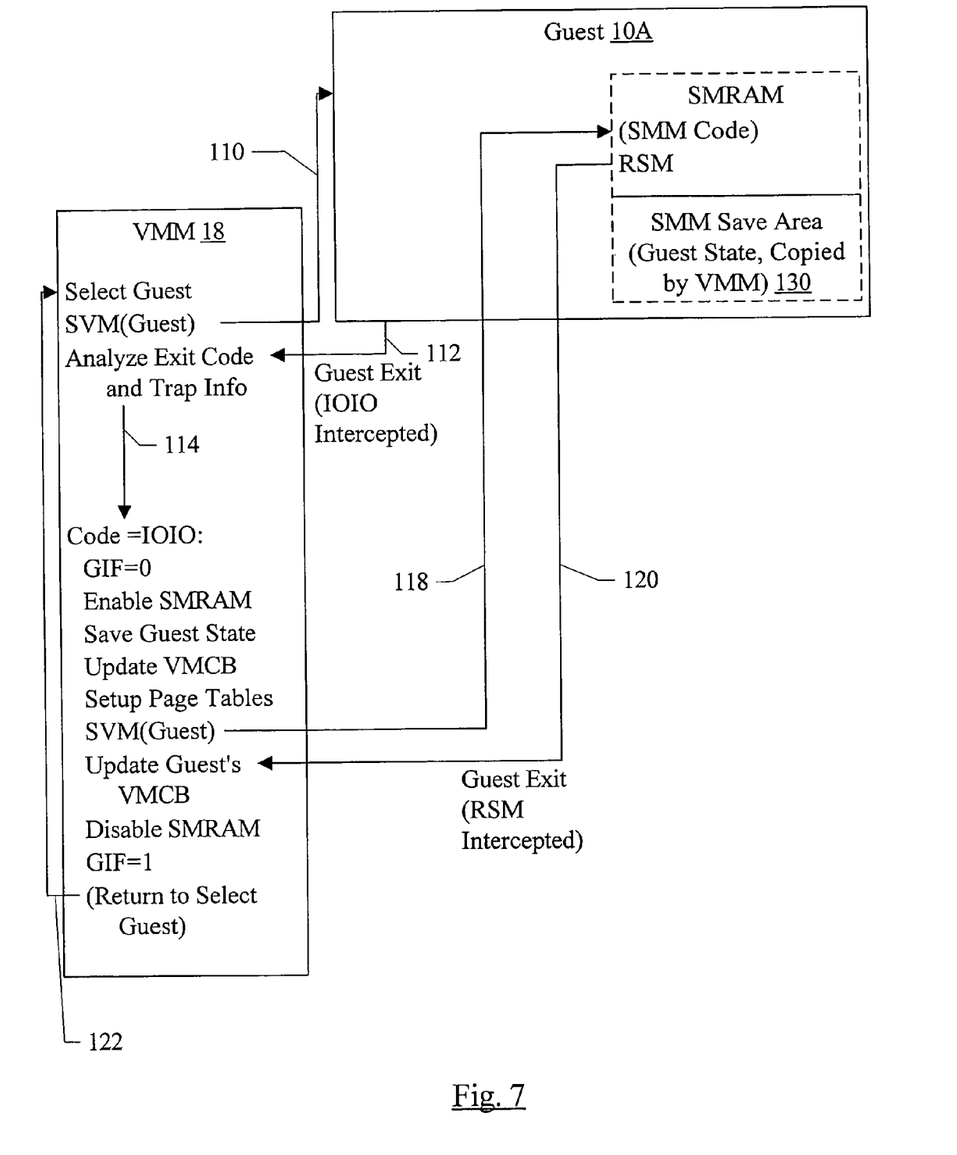
FIG. 7 is a block diagram illustrating a third embodiment of virtualizing SMM code.

FIG. 7 is an example in which the guest's SMM code is to be executed rather than the platform SMM code. The guest's SMM code may be included in the guest 10A, rather than in a separate guest 10B such as the example of FIG. 6. The example of FIG. 7 may generally be similar to the example of FIG. 6, in which the guest 10A is selected and execution is started in the guest 10A (arrow 110) and the detection of a guest exit due to an IOIO intercept (arrow 112). The VMM 18 may analyze the exit code and trap information to determine that the intercept is an IOIO intercept and that the guest's SMM code is to be executed. Execution proceeds at the code for IOIO intercepts (arrow 114). The execution for the IOIO intercept is generally similar to the example of FIG. 6 as well, except that guest state is stored into the SMM save area in the SMRAM within the guest 10A (reference numeral 130). Additionally, the VMCB for the guest 10A is updated to emulate the transition to SMM mode (and to intercept the RSM instruction) and the guest 10A is started again rather than starting the guest 10B.

In an alternative embodiment, if SMM code in the guest 10A is to be executed in response to an IOIO intercept, the VMM 18 may not enable SMRAM. Rather, SMRAM may be virtualized by changing the mappings in the shadow page tables to make SMRAM pages appear in the guest 10A's address space at the proper points. The remainder of the operation described above may be similar is such embodiments.

Figure 8:
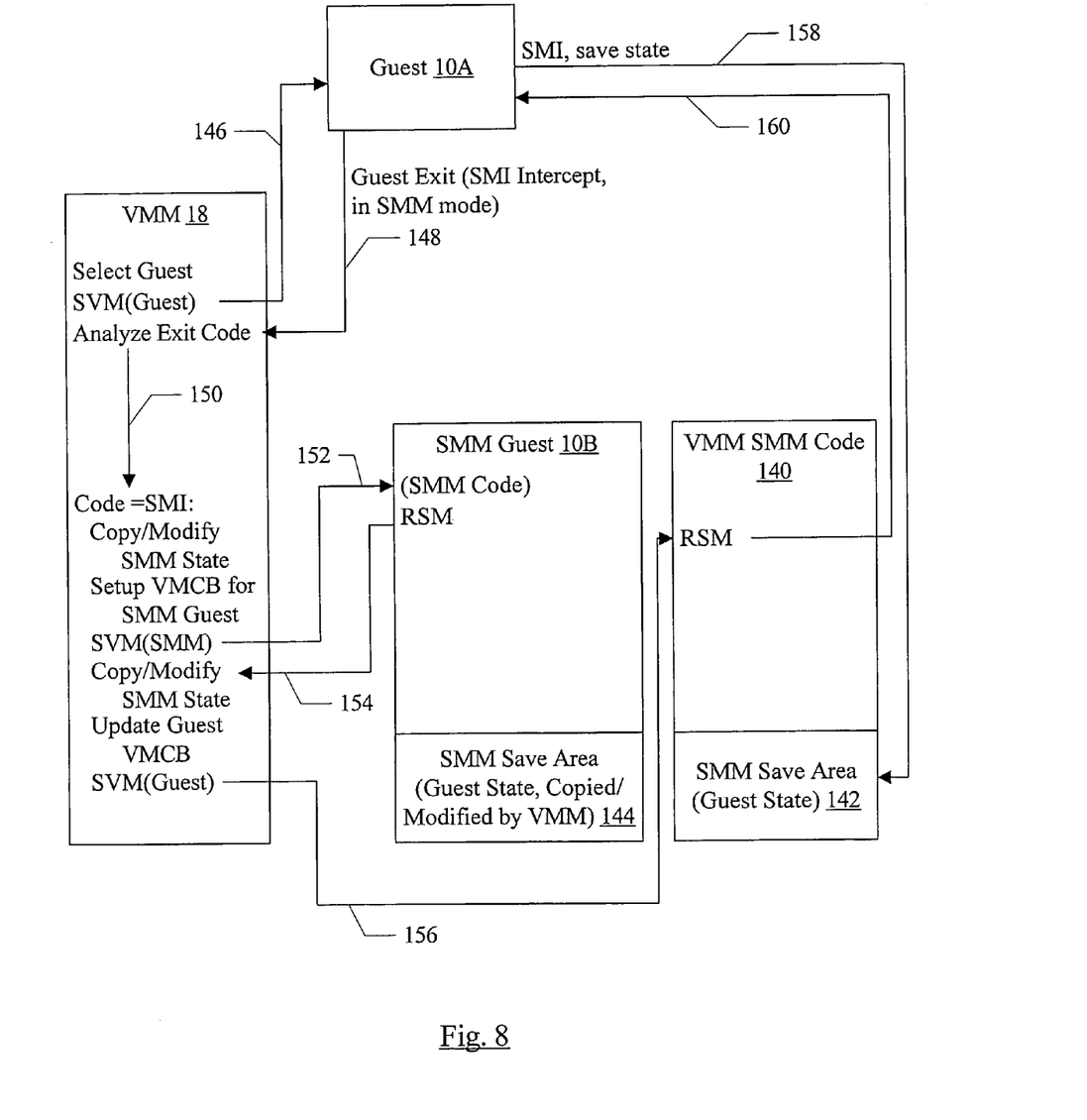
FIG. 8 is a block diagram illustrating a fourth embodiment of virtualizing SMM code.

FIG. 8 is another example of SMM virtualization. In the embodiment of FIG. 8, an SMI intercept may be supported by the processor 30, but the guest exit may occur after the processor 30 has transitioned to SMM mode. That is, the guest exit may occur after the guest's state has been saved to an SMM save area and after the processor 30 has made internal state changes to transition to SMM mode, but prior to fetching the first instruction in the SMM code. Additionally, the processor 30 may generate the SMI acknowledgement message to the system and indicate that SMM is active prior to exiting the guest. Accordingly, for the example of FIG. 8, the VMM 18 may program the SMBASE register to an SMRAM area established by the VMM 18. The area may include VMM SMM code 140 in the illustrated embodiment, as well as an SMM save area 142. Additionally, an SMM guest 10B is shown in FIG. 8, including a second SMM save area 144 and the non-trusted SMM code (e.g. platform SMM code or guest SMM code).

Generally, the VMM 18 may select a guest to execute, and may execute the SVM instruction to cause the guest to begin execution on a processor (arrow 146). The VMM 18 may set the SMI intercept in the VMCB 22 of the guest 10A, to intercept any SMI that may occur during execution of the guest 10A. Other intercepts may be set as desired (e.g. the CR0, CR3, and PF intercepts may be set as part of managing the shadow page tables for the guest 10A).

If an SMI occurs, in this embodiment, the processor 30 may exit the guest after the transition to SMM mode but prior to fetching the first instruction in the SMM code. Accordingly, if an SMI occurs, the state of the guest 10A is saved by the processor 30 hardware in the SMM save area 142 (since the SMRAM including the SMM save area 142 is pointed to by the SMBASE register) (arrow 158). It is noted that, since SMM mode is entered prior to exiting the guest 10A, the SMRAM may be visible within the guest 10A. However, since the guest is exited before the next instruction is fetched, the guest 10A may not access/update the SMRAM. The processor 30 may exit the guest 10A, but may be in SMM mode (arrow 148). The VMM 18 may continue executing subsequent to the SVM instruction. The VMM 18 may analyze the exit code in the VMCB 22 of the guest 10A, and determine that the exit code indicates an SMI. The VMM 18 may begin executing code that corresponds to the SMI intercept (arrow 150). In embodiments in which a partial state save and restore is performed by the processor on guest exit, the VMM 18 may save the remainder of the guest processor state to the VMCB 22 of the guest 10A (not shown in FIG. 8). The VMM 18 may also reload its own remaining processor state from its own state save area (also not shown in FIG. 8).

As mentioned above, the processor 30 saves the guest state to the SMM save area 142 as part of entering SMM. The saved state may include various changes to the processor state that the VMM makes to retain control over the guest (e.g. changing CR3 to point to the shadow page tables instead of the guest's page tables, changing CR0 to ensure paging is enabled, etc.). That is, some of the processor state in the SMM save area 142 may not correspond to the state that the guest attempted to establish (and that the VMM intercepted). The VMM 18 may copy the guest state from the SMM save area 142 to the SMM save area 144, and may modify the state to "undo" the VMM changes to the guest state. That is, the modified guest state in the SMM save area 144 may include the state that the guest attempted to establish and that the VMM intercepted (e.g. the guest-created CR3 and CR0 values).

The VMM 18 may also setup the SMM's VMCB (for the guest 10B), if it has not already been created. The SMM guest 10B's VMCB may include establishing paged real mode for the guest in CR0, have its instruction pointer set to the entry point to the SMM code in the guest 10B, and may set the RSM intercept. Additionally, the CR0, CR3, and PF intercepts may be set to manage paged real mode.

The VMM 18 may then execute the SVM instruction, starting the guest 10B (arrow 152). The SMM code may then execute in the guest 10B, illustrated by "(SMM code)" in FIG. 8. If any intercepts occur while the SMM code is executing, the guest 10B exits but the processor 30 remains in SMM. The VMM 18 may process the event that caused the intercept.

The SMM code completes with the RSM instruction, which is intercepted by the processor in this example (arrow 154). The processor invokes the VMM 18 (which has its instruction pointer pointing to the instruction after the SVM that started the guest 18B). The VMM 18 may copy the guest state from the SMM save area 144 to the SMM save area 142, capturing any modifications made by the SMM code in the guest 10B. Additionally, the VMM 18 may modify the guest state in the SMM save area 142 to reapply the state changes made by the VMM 18 to retain control of the guest (e.g. CR3 and CR0 modifications, as discussed above). The VMM 18 may also update the guest 10A's VMCB 22, particularly to point the instruction pointer to the RSM instruction in the VMM SMM code 140. Other updates may also be performed, although most processor state updates may occur via the execution of the RSM instruction in the VMM SMM code 140. The RSM intercept is not set. In some embodiments, interrupts may be disabled to ensure that the RSM instruction is executed without an interrupt occurring.

The VMM 18 may execute the SVM instruction to resume guest 10A. Guest 10A begins execution at the RSM instruction in the VMM SMM code 140 (briefly in non-paged real mode). Execution of the RSM instruction is not intercepted, and causes the processor 30 to exit SMM, reload the guest state from the SMM save area 142, and return to execution in the guest 10A at the point at which the SMI was taken (arrow 160). Exiting SMM may also include generating the SMI acknowledgement message to the system and clearing SMM active.

The example of FIG. 8 may use more of the processor 30 hardware for handling SMM transitions (due to an SMI and the RSM instruction) and thus may require less emulation in the VMM 18, in some embodiments. Particularly, the processor state saving that is part of the SMM transitions may not need to be emulated. In some embodiments, higher performance may be achievable due to the lower amount of emulation while still permitting the VMM 18 to retain control of the system.

In yet another example, rather than intercepting the SMI, the SMI may be permitted to be taken, fetching the first instruction from the VMM SMM code 140. In such an embodiment, the first instruction may be a call to the VMM 18. The code at the call entry point may be similar to the code indicated at the end of arrow 150 in FIG. 8.

Figure 9:
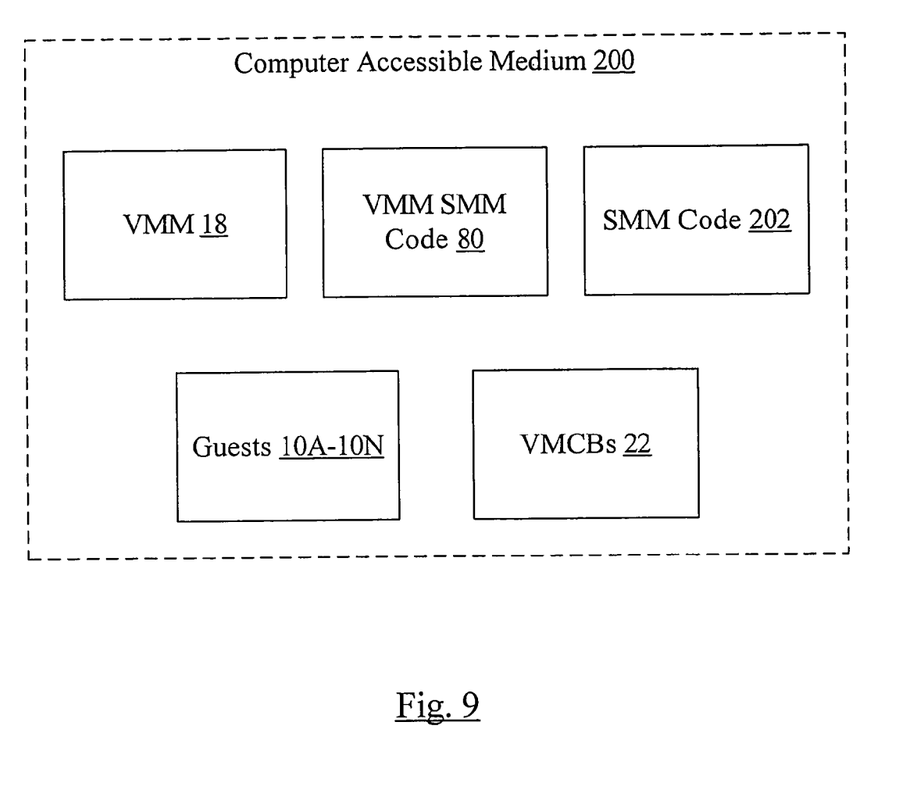
FIG. 9 is a block diagram of one embodiment of a computer accessible medium.

Turning now to FIG. 9, a block diagram of a computer accessible medium 200 is shown. Generally speaking, a computer accessible medium may include any media accessible by a computer during use to provide instructions and/or data to the computer. For example, a computer accessible medium may include storage media such as magnetic or optical media, e.g., disk (fixed or removable), tape, CD-ROM, or DVD-ROM, CD-R, CD-RW, DVD-R, DVD-RW, volatile or non-volatile memory media such as RAM (e.g. synchronous dynamic RAM (SDRAM), Rambus DRAM (RDRAM), static RAM (SRAM), etc.), ROM, Flash memory, non-volatile memory (e.g. Flash memory) accessible via a peripheral interface such as the Universal Serial Bus (USB) interface, etc., as well as media accessible via transmission media or signals such as electrical, electromagnetic, or digital signals, conveyed via a communication medium such as a network and/or a wireless link. The computer accessible medium 200 in FIG. 9 may store one or more of the VMM 18, one or more VMCBs 22, VMM SMM code 80, SMM code 202 (which may be platform SMM code or guest SMM code), and/or guests 10A-10N. The VMM 18 may comprise instructions which implement the operations described for the VMM 18 herein. Similarly, the VMM SMM code 80 may comprise instructions which implement the operations described for the VMM SMM code 80 herein and the SMM code 202 may comprise instructions which implement the operations described for the SMM code herein. Generally, the computer accessible medium 200 may store any set of instructions which, when executed, implement a portion or all of the operations shown in one or more of FIGS. 5-8. The computer accessible medium 200 may, in some embodiments, be part of the host hardware 20.

Numerous variations and modifications will become apparent to those skilled in the art once the above disclosure is fully appreciated. It is intended that the following claims be interpreted to embrace all such variations and modifications.

What is claimed is:

1. A method comprising:
    making one or more changes to processor state corresponding to a second guest to control access by the second guest to corresponding physical processor hardware, the one or more changes made by a virtual machine monitor (VMM);
    starting execution of the second guest by the VMM;
    detecting an event that would cause a processor to transition to a system management mode (SMM), wherein first code is to be executed in the SMM, wherein the first code is stored in an SMM address space that is usable in the SMM and not in other modes, and wherein the SMM address space is located by an SMM base address stored in an SMM base address register that is separate from a page table base address register that stores a base address locating a plurality of page tables storing address translations;
    allocating a virtual machine control block data structure for a first guest in which the first code is to execute, the allocating performed in response to detecting the event;
    causing the first code to be executed in the first guest, using the virtual machine control block data structure, responsive to the detecting;
    exiting the second guest, wherein the second guest is executing when the detecting occurs;
    storing processor state corresponding to the second guest in a state save area accessible to the first code; and
    modifying the saved processor state in the state save area to replace the changes to the processor state that were made by the VMM with the processor state that corresponded to the second guest prior to the changes.

2. The method as recited in claim 1 wherein the detecting comprises intercepting the event during execution of the second guest.

3. The method as recited in claim 2 wherein causing the first code to be executed in the first guest comprises:
    invoking a virtual machine monitor responsive to the exiting;
    making the transition to the SMM subsequent to the invoking; and
    executing second code in the first mode to prepare to execute the first code in the SMM in the first guest.

4. The method as recited in claim 3 further comprising saving processor state corresponding to the virtual machine monitor in a state save area associated with the second code.

5. The method as recited in claim 1 further comprising emulating the transition to the SMM.

6. The method as recited in claim 5 wherein the SMM includes enabling the SMM address space, and wherein the emulating comprises mapping one or more pages of memory corresponding to the SMM address space for access by the first code.

7. The method as recited in claim 1 further comprising intercepting an instruction in the first code that indicates completion of the first code and updating state corresponding to the first guest responsive to the intercepting.

8. The method as recited in claim 1 wherein the intercepting occurs subsequent to transitioning to the SMM but prior to fetching a first instruction in the first code.

9. The method as recited in claim 8 further comprising:
    invoking a virtual machine monitor responsive to the exiting; and
    the virtual machine monitor copying processor state saved to a first state save area during the transitioning to the state save area that is accessible to the first code.

10. The method as recited in claim 9 further comprising executing a return instruction from the SMM without intercepting the return instruction.

11. A computer accessible storage medium storing a plurality of instructions comprising instructions which, when executed, make one or more changes to processor state corresponding to a second guest to control access by the second guest to corresponding physical processor hardware, and wherein the instructions, when executed start execution of the second guest, and wherein the instruction that make the changes and start the execution of the second guest are part of a virtual machine monitor, and wherein the instructions, when executed responsive to detecting an event that would cause a processor to transition to a system management mode (SMM), allocate a virtual machine control block data structure for a first guest in which first code is to execute and cause the first code to be executed in the first guest, wherein the first code is stored in an SMM address space that is usable in the SMM and not in other modes, wherein the SMM address space is located by an SMM base address stored in an SMM base address register that is separate from a page table base address register that stores a base address of a plurality locating page tables storing address translations, and detecting the event includes exiting the second guest that is executing when the detecting occurs, and wherein the instructions, when executed, store processor state corresponding to the second guest in a state save area accessible to the first code, and wherein the instructions, when executed, modify the stored processor state in the state save area to replace the changes that were made by the VMM with the processor state that corresponded to the second guest prior to the changes.

12. The computer accessible storage medium as recited in claim 11 wherein the instructions, when executed responsive to the exit of the second guest, permit the transition to the SMM subsequent to the invoking, and wherein the plurality of instructions further comprise second code executed in the SMM to prepare to execute the first code in the SMM in the first guest.

13. The computer accessible storage medium as recited in claim 11 wherein the instructions, when executed, emulate the transition to the SMM.

14. The computer accessible storage medium as recited in claim 13 wherein the SMM includes enabling the SMM address space, and wherein emulating the transition to the SMM comprises mapping one or more pages of memory corresponding to the address space for access by the first code.

15. The computer accessible storage medium as recited in claim 11 wherein the plurality of instructions further comprise second instructions executed responsive to the processor intercepting an instruction in the first code that indicates completion of the first code, the second instructions, when executed, updating state corresponding to the first guest.

16. The computer accessible storage medium as recited in claim 11 wherein the intercepting occurs subsequent to transitioning to the SMM but prior to fetching a first instruction in the first code.

17. The computer accessible storage medium as recited in claim 16 wherein the instructions are executed subsequent to exiting the second guest, and wherein the instructions, when executed, are further configured to:

copy processor state saved to a first state save area during the transitioning to the state save area accessible to the first code.

18. The method as recited in claim 5 wherein the emulating comprises emulating one or more operations that occur in the transition to the SMM under control of one or more values written to a control register by one or more instructions executed prior to causing the first code to execute in the first guest, and wherein the operations occur on an interface of a processor and communicate to other system components in a computer system with the processor.

19. The computer accessible storage medium as recited in claim 13 wherein the instructions which, when executed, emulate the transition comprise instructions which, when executed, write one or more values to a control register, and wherein a processor emulates one or more operations that occur in the transition to the SMM under control of the one or more values, and wherein the operations occur on an interface of a processor and communicate to other system components in a computer system with the processor.

20. The method as recited in claim 1 further comprising modifying additional processor state in the state save area to hide the additional processor state from the first code.

21. The computer accessible medium as recited in claim 11 wherein the instructions, when executed, modify additional processor state in the state save area to hide the additional processor state from the first code.

* * * * *